United States Patent [19]

Ikeda et al.

[11] 4,252,918
[45] Feb. 24, 1981

[54] BROMINATED RUBBER

[75] Inventors: Hiroharu Ikeda, Machida; Yasuyuki Shimozato; Kohei Goto, both of Yokohama, all of Japan

[73] Assignee: Japan Synthetic Rubber Co., Ltd., Tokyo, Japan

[21] Appl. No.: 43,743

[22] Filed: May 30, 1979

[30] Foreign Application Priority Data

May 31, 1978 [JP] Japan .................................. 53-64308
Apr. 11, 1979 [JP] Japan .................................. 54-43113

[51] Int. Cl.$^3$ ............................ C08F 8/20; C08F 8/22
[52] U.S. Cl. ..................................... 525/333; 260/3.5; 260/23.7 A; 260/23.7 H; 260/23.7 M; 260/30.8 R; 260/32.4; 260/32.6 A; 260/33.2 R; 525/192; 525/241; 525/354; 525/358
[58] Field of Search .......... 260/96 HAL, 3.5, 23.7 H, 260/23.7 A, 23.7 M, 30.8 R, 32.4, 32.6 A, 33.2 R; 525/358, 192, 241, 333, 354

[56] References Cited

U.S. PATENT DOCUMENTS

| | | | |
|---|---|---|---|
| 3,039,977 | 6/1962 | Ingram | 260/96 HA |
| 3,050,476 | 8/1962 | Tress et al. | 525/358 |
| 3,691,262 | 9/1972 | Hagerman | 525/358 |
| 4,026,933 | 5/1977 | Edwards | 525/358 |

OTHER PUBLICATIONS

Chem. Abstracts 85:P6609g, 3-1976, Chiba et al.
Chem. Abstracts 84:60904s, Kuramochi et al, 10-1975.
Chemical & Process Technology Encyclopedia, Considine, E., pp. 387-390, (1974) McGraw-Hill.

*Primary Examiner*—William F. Hamrock
*Attorney, Agent, or Firm*—Oblon, Fisher, Spivak, McClelland & Maier

[57] ABSTRACT

When an elastomeric copolymer of a $C_4$ or $C_5$ conjugated diene and an aromatic vinyl compound is brominated in latex while keeping the uniformity of the latex until the amount of bormine combined with the copolymer reaches 0.5-15% by weight, the resulting brominated conjugated diene-aromatic vinyl compound rubber contains 3-80% by weight of a toluene-insoluble fraction formed by the bromination and has a high green strength and a good processability. A vulcanized rubber obtained from said brominated rubber has a high modulus of elasticity and a high tensile strength. When an anionic surfactant is used as an emulsifier, the uniformity of the above-mentioned latex can be kept by adjusting the pH value of the bromination reaction system to 9 or highter, preferably 10 or higher, during the reaction or by auxiliarily adding a nonionic surfactant. When a cationic or nonionic surfactant is used as an emulsifier, regulation of pH is unnecessary.

19 Claims, No Drawings

BROMINATED RUBBER

This invention relates to a brominated rubber good in processability and capable of providing vulcanized rubber having a high modulus of elasticity. More particularly, this invention relates to a brominated rubber good in processability and capable of providing a vulcanized rubber having a high modulus of elasticity, obtained by brominating an elastomeric copolymer of $C_4$ or $C_5$ conjugated diene and aromatic vinyl compound in latex until the amount of bromine combined with the copolymer reaches 0.5-15% by weight.

Recently, it has become desired in the specific field that a general purpose vulcanized rubber has a higher modulus of elasticity (for example, the 100% modulus thereof is 1.5-2 times that of conventional vulcanized rubbers). Of course, it is desirable in this case that the vulcanized rubber is comparable to conventional vulcanized rubbers in rubber properties other than modulus, and its rubber compound has a good processability.

It is disclosed in Japanese Patent Application Kokai (Laid-Open) No. 130882/1975 that a brominated rubber produced by adding 1.5-30% by weight of bromine to a styrene-butadiene rubber in solution in an organic solvent can be vulcanized with sulfur and magnesium oxide and the resulting vulcanized rubber has sufficiently good properties. However, the vulcanizate of this brominated rubber has not so high a modulus of elasticity as to satisfy the recent requirements.

On the other hand, as a process for the bromination of a rubber, it is disclosed in Japanese Patent Application Kokai (Laid-Open) No. 25592/1976 that a flame-retardant molding material can be obtained by coagulating a butadiene-styrene latex to give a powdery copolymer, dispersing the latter in water or methanol with an emulsifier and highly brominating the resulting dispersion. However, such a high degree of bromination comes to yield a resinous substance, and the vulcanization thereof cannot result in any rubbery vulcanizate having a high modulus of elasticity.

The present inventors have conducted extensive research with the aim of obtaining a vulcanized rubber having a high modulus of elasticity and a good processability and, as a result, have found a surprising fact that a brominated rubber obtained by brominating a conjugated diene-aromatic vinyl elastomeric copolymer in latex while keeping the uniformity of the latex until the amount of bromine combined with the copolymer reaches 0.5-15% by weight is good in processability and can provide a vulcanized rubber having a high modulus of easticity.

It is an object of this invention to provide a brominated rubber capable of giving a vulcanized rubber having a high modulus of easticity.

It is another object of this invention to provide a brominated rubber having a high green strength and a good processability and providing a vulcanized rubber having a high modulus of elasticity.

It is a further object of this invention to provide a rubber compound comprising a brominated conjugated diene-aromatic vinyl elastomeric copolymer in which 0.5-15% by weight of bromine has been combined with the copolymer.

It is still another object of this invention to provide a brominated rubber having a high green strength and a good processability and capable of providing a vulcanized rubber having a high modulus of elasticity and an excellent tensile strength.

Other objects and advantages of this invention will be apparent from the following description.

According to this invention, there is provided a brominated rubber obtained by brominating an elastomeric copolymer composed of 50% by weight or more of a $C_4$ or $C_5$ conjugated diene and 50% by weight or less of an aromatic vinyl compound in latex while keeping the uniformity of the latex until the amount of bromine combined with the copolymer reaches 0.5-15% by weight, said brominated rubber containing 3-80% by weight of a toluene-insoluble fraction formed by the bromination. Said brominated rubber is good in processability and high in green strength and can provide a vulcanized rubber having a high modulus of elasticity and a high tensile strength.

In order to obtain the brominated rubber of this invention, it is necessary to brominate said elastomeric copolymer in latex until the amount of bromine combined with the copolymer reaches 0.5-15% by weight and to keep the uniformity of the latex during the bromination.

By these procedures, the resulting brominated rubber comes to contain 3-80% by weight of a toluene-insoluble fraction formed by the bromination which seems to contribute to the improvement of green strength and the improvement of modulus and tensile strength of vulcanizate.

The term "uniformity of latex" used herein means that the latex is not coagulated during the bromination. In practice, the deposition of a small amount of a coagulum is permitted when a suitable reactor is selected, though the upper limit of the amount is about 25% by weight. The more reduced the amount of the coagulum formed, the better the result, and the amount is preferably 10% by weight or less, more preferably 5% by weight or less, most preferably 2% by weight or less. In order to keep the uniformity of latex, the following method may be taken:

(1) An anionic surfactant is used as the emulsifier and the pH of the system is maintained at 9 or more, preferably 10 or more, more preferably 11 or more, during the bromination.

(2) An anionic surfactant is used as the emusifier, and a nonionic surfactant is also used auxiliarily in an amount of 2 to 15% by weight based on the wcight of the elastomeric copolymer without adjusting the pH of the latex.

(3) An anionic surfactant is used as the emulsifier, a nonionic surfactant is also used auxiliarily, and the latex is made acidic (namely, the pH of the latex is adjusted to less than 7) before the bromination. In this case, the amount of the nonionic surfactant may be more reduced than in above method (2), and an amount of 2 to 10% by weight is sufficicnet.

(4) A cationic surfactant is used as the emulsifier.

(5) A nonionic surfactant is used as the emulsifier.

Among above methods (1) to (5), preferred are (1), (2) and (3) in which a latex formed with an anionic surfactant is used as the starting material, and methods (1) and (3) are more preferable. The most preferable is method (1).

Emulsion-polymerized SBR laticies produced at present on a commercial scale contain an anionic surfactant as an emulsifier, and therefore, when these latices are used in the above-mentioned bromination, it is not necessary to further add an anionic surfactant to the latices.

The use of a cationic surfactant as in above method (4) is disadvantageous economically, and the use of a nonionic surfactant alone as in above method (5) makes the coagulation of latex relatively difficult.

The amount of the anionic surfactant used as the emulsifier is such that the surfactant is usually contained in an elastomeric copolymer latex as produced. It is usually 0.5 to 15% by weight based on the weight of the elastomeric copolymer. In methods (4) and (5), the amount of the surfactant as the emulsifier is not critical, and it may be 0.5 to 15% by weight based on the weight of the elastomeric copolymer.

As said anionic surfactant, there may be used alkali metal salts of higher fatty acids such as potassium oleate, sodium oleate, sodium stearate and the like; rosin acid; salts of disproportionated rosin acid with an alkali metal such as sodium, potassium, and the like; tall oil soap; alkali metal salts of sulfonic acids such as potassium dodecylbenzenesulfonate, potassium ligninsulfonate and the like; and salts of mono-sulfuric esters of higher alcohols such as sodium salt of mono-sulfuric ester of oleyl alcohol. As said nonionic surfactant, there may be used polyalkylene oxides such as polyoxyethylene cetyl ether, polyoxyethylene lauryl ether and the like; monoesters of higher fatty acids (for example, oleic acid, lauric acid and the like) with polyhydric alcohols such as pentaerythritol and the like; polyoxyalkylene alkylphenyl ethers such as polyoxyethylene nonylphenyl ether and the like; and the like. As said cationic surfactant, there may be used quaternary ammonium salts and pyridinium salts having a long chain alkyl group such as dodecyltrimethylammonium chloride, triethanolamine monostearate, pyridinium salt of N-methylololeamide and the like. In combination with the above-mentioned emulsifiers, there may also be used a dispersing agent such as sodium salt of a naphthalenesulfonic acid-formaldehyde condensate or the like; and an inorganic salt such as sodium pyrophosphate, potassium chloride or the like.

In order to keep the reaction system at a pH of 9 or more, an alkali is added to the system. As said alkali, there may be used alkali metal hydroxides typified by caustic soda, caustic potash and the like; ammonia; and aliphatic, alicyclic and aromatic amino compounds such as diethylamine, triethylamine, triethanolamine, N-phenylaniline, piperazine, morpholine and the like. Among these alkalis, aqueous solutions of alkali metal hydroxides such as caustic soda, caustic potash and the like are particularly preferable from the viewpoint of easiness of handling. If the pH value is lower than 9, coagulation occurs to a marked extent and the tensile properties of the resulting brominated rubber cannot be improved. A large amount of said alkali may be added at once at the start so that a pH value of 9 or more can be maintained till the completion of the bromination, or alternatively, the alkali may also be added in small portions successively throughout the bromination reaction. It is preferable to keep the pH value at 11 or more, that is, to maintain the system strongly alkaline, because the green strength of the resulting brominated rubber, and the heat stability and tensile strength of vulcanizate are enhanced.

The brominated rubber obtained by the above-mentioned bromination reaction usually contains 3–80% by weight of a toluene-insoluble fraction formed by the bromination. A content of the toluene-insoluble fraction of less than 3% is insufficient to retain a high modulus of elasticity. A content of more than 80% adversely affects the processability of the brominated rubber.

The elastomeric copolymer of a $C_4$ or $C_5$ conjugated diene and an aromatic vinyl compound used in this invention contains the conjugated diene in an amount of 50% by weight or more, preferably 60% by weight or more. The copolymer is usually obtained by emulsion polymerization or solution polymerization. As said $C_4$ or $C_5$ conjugated diene, there may be used butadiene, isoprene, 1,3-pentadiene and their mixtures. As said aromatic vinyl compound, there may be used styrene, $\alpha$-methylstyrene, vinyltoluene and the like, among which styrene is preferable. Preferable examples of said copolymer rubber are styrene-butadiene rubber, styrene-isoprene rubber, styrene-butadiene-isoprene rubber, styrene-butadiene-1,3-pentadiene rubber and the like.

As the latex of elastomeric copolymer used in this invention, there may be used a latex of an aromatic vinyl-conjugated diene copolymer rubber in which the rubber is dispersed in water by the action of an emulsifier. When, for example, a styrene-butadiene copolymer rubber is produced by emulsion polymerization, from the emulsion after the termination of the polymerization is removed unreacted monomer by steam-stripping, and the resulting styrene-butadiene copolymer rubber latex may be used in this invention. Furthermore, a latex of the styrene-butadiene copolymer rubber obtained by adding a solution of the copolymer rubber in an organic solvent to water containing an emulsifier with stirring and then removing the solvent may also be used in this invention.

In the bromination reaction in this invention, bromine is used as the brominating agent. In the actual reaction, there is used the bromine generated from an aqueous acidic solution of potassium bromide-potassium bromate, a saturated aqueous bromine solution obtained by dissolving bromine itself in water containing potassium bromide, a complex compound of bromine such as dioxane dibromide, or the like.

The temperature of the bromination reaction is 0° to 100° C., and preferably 10° to 90° C. The reaction is usually carried out by adding a brominating agent to a latex of an aromatic vinyl-conjugated diene elastomeric copolymer with stirring.

The brominated rubber produced by the bromination may be recovered by depositing the rubber as a clammy product by the conventional coagulation process, for example, by pouring the latex into an excess of methanol, or by coagulating the latex by addition of a salt such as calcium chloride, alminium sulfate, magnesium sulfate or the like, or coagulating the latex by first adding such a salt as sodium chloride or a polymeric coagulant such as glue, polyamine or the like to the latex, thereby creaming it and adding thereto an acid such as sulfuric acid, hydrochloric acid, acetic acid, oxalic acid or the like, or by a combination of these methods. The thus recovered rubber is then washed and dried to obtain a solid rubber.

It is important that the bromine content of the brominated rubber used in this invention is limited to a range of 0.5–15% by weight, preferably 1–10% by weight. Usually, the toluene-insoluble fraction content is varied depending upon the reaction conditions, and the larger the bromine content in the copolymer, the larger the toluene-insoluble fraction content. When the bromine content is 0.5 to 15% by weight, the copolymer usually contains 3 to 80% by weight of the toluene-insoluble fraction. If the bromine content is less than 0.5% by weight, a high modulus of elasticity cannot be obtained though the processability is good. If the bromine content is more than 15% by weight, the processability is not satisfactory though the modulus of elasticity is sufficiently high. When the bromine content is in the range of 1 to 10% by weight, the amount of toluene-insoluble fraction is usually 5 to 50% by weight. The bromine content can be controlled by varying the amount of a brominating agent added to the brominating reaction system.

Into the brominated rubber of this invention are incorporated the conventional additives usually used in rubbers. Said additives include reinforcing agent, filler, vulcanizing ingredients, softening agent, processing aid, antioxidant and the like. As said reinforcing agent, there may be used reinforcing carbon black for rubber, and the like. Said vulcanizing ingredients include vulcanizing agents such as inorganic sulfurs; organic sulfur-containing compounds, for example, thiuram polysulfide, morpholine disulfide and the like, organic peroxides, and the like; vulcanizing aids such as zinc oxide, litharge, cadmium oxide, carbonates (for example, magnesium carbonate, zinc carbonate and the like), higher fatty acid salts (for example, zinc stearate, zinc oleate and the like), higher fatty acids (for example, stearic acid, oleic acid, lauric acid and the like), ethanolamine and the like; and vulcanization accelerators such as dithiocarbamates, thiurams, xanthogenic acid derivatives, thiazoles, sulfenamides, thioureas, guanidines, aldehydeamines, amines and the like. These vulcanizing ingredients may be used in any appropriate combination. As said softening agent, aromatic oil, naphthenic oil and the like may be used.

These additives can be compounded with the brominated rubber by means of rolls, a Banbury mixer or the like. It is also possible to produce an oil-extended rubber by adding an aromatic, naphthenic or aliphatic oil in any step after the completion of bromination reaction and before the coagulation and drying. The resulting rubber compound is vulcanized usually at a temperature of 100° C. to 180° C. for a period of 5 to 120 minutes, whereby a vulcanized rubber having a high modulus of elasticity is obtained.

The brominated rubber of this invention has a high green strength, tends to have a lower compound Mooney viscosity, and has a good processability. Usually, its vulcanizate has a 50% modulus of 20 kg/cm$^2$ or more or a 100% modulus of 40 kg/cm$^2$ or more with a low temperature dependency, and has a tensile strength at break of 130 kg/cm$^2$ or more and an elongation at break of 80% or more, all at room temperature. Accordingly, the brominated rubber of this invention is useful as a part requiring a high modulus of elasticity in the rubber articles such as tire especially for the bead and tread, industrial belt, rubber vibration insulator and the like. It is also allowable to incorporate other vulcanizable rubbers such as natural rubber (NR), polyisoprene rubber (IR), polybutadiene rubber (BR), styrene-butadiene rubber (SBR), acrylonitrile-butadiene rubber (NBR), chloroprene rubber (CR), ethylene-propylene-diene rubber (EPDM), isobutylene-isoprene rubber (IIR) and the like, preferably natural rubber, polyisoprene rubber, polybutadiene rubber or styrene-butadiene rubber, into the brominated rubber of this invention unless the essence of this invention is changed. The brominated rubber of this invention can be blended with the above-mentioned vulcanizable rubbers in order to improve the green strength of the latter rubbers or to improve the modulus of their vulcanizates.

In this invention, the amount of the toluene-insoluble fraction was determined by adding approximately 1 g of a finely chipped brominated rubber sample to 50 ml of toluene, allowing it to stand at room temperature for 24 hours, then filtering it with a wire gauze of 200 mesh, drying it under reduced pressure at 50° C. for 24 hours and then weighing the rubber remaining on the gauze.

The physical properties mentioned herein refer to those of the rubber obtained by removing the coagulum fromed in the bromination from the brominated latex and then coagulating the resulting latex.

Referring to Examples, this invention will be explained below in more detail, but this invention is not limited to the Examples.

The rubber latex used in the following Examples were synthesized by an emulsion polymerization process with the conventional sulfoxylate recipe. In any Examples, the polymerization temperature was 5° C., and when the conversion of polymerization reached 60–70%, the polymerization was terminated and unreacted monomer was removed by steam stripping or distillation under reduced pressure. Table 1 shows the monomer composition after polymerization, the kind of emulsifier, the properties of resulting polymer, etc.

TABLE 1

|  | Latex A | Latex B | Latex C | Latex D | Latex E | Latex F | Latex G |
|---|---|---|---|---|---|---|---|
| Monomer (% by wt.)*1 | | | | | | | |
| Styrene | 23.5 | 23.5 | 46 | 19 | 24 | 23 | 25 |
| Butadiene | 76.5 | 76.5 | 54 | — | 76 | 77 | 75 |
| Isoprene | — | — | — | 81 | — | — | — |
| Emulsifier used for polymerization | Potassium salt of dispropor- tionated rosin acid | Potassium salt of dispropor- tionated rosin acid | Potassium salt of dispropor- tionated rosin acid | Potassium salt of dispropor- tionated rosin acid | Sodium dodecyl- benzene- sulfonate | Polyoxy- ethylene nonyl- phenyl ether (HLB 14.4) | Dodecyl- trimethyl- ammonium chloride |
| Concentration of emulsifier (% by wt. based on rubber) | 7.0 | 7.0 | 7.0 | 7.0 | 7.0 | 7.0 | 7.0 |
| Solid content (%) | 24 | 24 | 22 | 25 | 22 | 21 | 20 |
| Mooney viscosity | | | | | | | |

TABLE 1-continued

| | Latex A | Latex B | Latex C | Latex D | Latex E | Latex F | Latex G |
|---|---|---|---|---|---|---|---|
| $ML_{1+4}^{100°C.}$ of raw rubber | 31*2 | 58*2 | 48 | 48 | 90 | 30 | 54 |

Notes:
*1 Polymer composition after polymerization analyzed by a refractive index method, provided that the polymer composition of Latex D was analyzed by an IR spectroscopy.
*2 $MS_{1+4}^{100°C.}$ The bromine content of the brominated rubber was quantitatively analyzed by a flask combustion method according to JIS K-5580. The recipe of the rubber compound used in the Examples was as shown in Table 2. The processability of the rubber was evaluated by observing the behavior of the rubber in rolling, namely by observing the tendency to form a tight band around the roll and the surface state of rubber band around the roll.

TABLE 2

| Compounding Recipe | |
|---|---|
| Rubber | 100 parts by weight |
| ISAF carbon black | 50 parts by weight |
| High aromatic process oil [JSR AROMA] | 10 parts by weight |
| Zinc oxide | 5 parts by weight |
| Stearic acid | 3 parts by weight |
| Vulcanization accelerator (N-oxydiethylene-2-benzothiazole sulfenamide) | 1.5 parts by weight |
| Sulfur | 2.5 parts by weight |

The vulcanization of rubber was effected by pressing the rubber compound at 145° C. for 60 minutes. The tensile test was carried out according to the method of JIS K-6301.

Mooney viscosity was measured at 100° C. with rotor S or L. The measurements obtained with rotor L are approximately equal to 1.9 times the measurements obtained with rotor S.

In the Examples and Comparative Examples, an aqueous bromine solution obtained by dissolving 31 parts by weight of bromine and 1 part by weight of potassium bromide in 1,000 parts by weight of water was used in the bromination of a rubber latex unless otherwise specified. The amount of bromine used in the bromination was expressed in parts by weight of bromine contained in the bromine solution used per 100 parts by weight of the rubber.

In the bromination of a rubber solution in the Comparative Examples, a bromine solution in 750 parts by weight of chloroform was dropped into a solution of 100 parts by weight of a rubber in 2,400 parts by weight of chloroform, unless otherwise specified. The amount of bromine used is expressed in parts by weight of bromine contained in the bromine solution used per 100 parts by weight of the rubber.

EXAMPLE 1

In 2,000 g of the SBR latex A shown in Table 1 was dissolved 60 g of a nonionic surfactant [polyoxyethylene nonylphenyl ether (HLB=14.4)] as an auxiliary emulsifier. The saturated aqueous bromine solution was dropped into the latex with stirring at room temperature over a period of 2 hours, and the mixture was subjected to reaction for an additional 30 minutes. After the reaction, the mixture was poured into an excess of methanol containing a small amount of 2,6-di-t-butyl-p-cresol to coagulate the rubber, after which it was dried. The brominated rubber thus obtained was compounded on rolls with the recipe in Table 2 and then vulcanized into a sheet. Subsequently, the properties of the vulcanized rubber were measured. The results obtained were as shown in Table 3.

EXAMPLES 2 TO 4 AND COMPARATIVE EXAMPLES 1 AND 2

The SBR latex A shown in Table 1 was brominated by repeating the procedure of Example 1, except that the amount of the saturated aqueous bromine solution was varied. Then, compounding of rubber and vulcanization were carried out in the same manner as in Example 1 and the tensile properties were measured in the same manner as in Example 1. The results obtained were as shown in Tabel 3. Comparative Example 1 relates to the use of unbrominated SBR latex A.

EXAMPLES 5 AND 5'

In the SBR latex A shown in Table 1 was dissolved polyoxyethylene nonylphenyl ether (HLB=14.4) in a proportion of 2% or 2.5% by weight based on the weight of the rubber used as an auxiliary emulsifier, and the pH of the latex was adjusted to 5.75 or 9.72, respectively, with dilute sulfuric acid (2%). Subsequently, the saturated aqueous bromine solution was dropped into the latex in an amount of 8.1 g as bromine per 100 g of the rubber used, and the resulting mixture was subjected to reaction. The percentage of coagulum was 4.3% and 9.8%, respectively.

When the latex was made acidic before the bromination, the percentage of coagulum was lower, and the amount of the nonionic surfactant could be reduced.

In the same manner as in Example 1, the rubber was recovered, compounded with the additives, and then vulcanized, after which tensile properties of the vulcanizate were measured to obtain the results shown in Table 3.

EXAMPLES 6 TO 8 AND COMPARATIVE EXAMPLES 3 TO 5

Using the SBR latices B, C and D shown in Table 1, the rubber was brominated with the saturated aqueous bromine solution, compounded and vulcanized in the same manner as in Example 1, after which the tensile properties were measured. The results obtained were as shown in Table 3.

Comparative Examples 3 to 5 relate to the use of unbrominated latices.

EXAMPLES 9 To 11 AND COMPARATIVE EXAMPLES 6 TO 8

The latices E, F and G shown in Table 1 were used, in which an alkylbenzenesulfonate type anionic surfactant, a nonionic surfactant and a cationic surfactant were used as an emulsifier, respectively.

The same procedure as in Example 1 was repeated, except that latex E, F or G was substituted for the latex A and no nonionic surfactant was added, to brominate the latex directly with the saturated aqueous bromine solution. The resulting brominated rubber was compounded and vulcanized in the same manner as in Example 1, and the tensile properties were measured. In the course of bromination, in the case of latex E, a coagulum was formed in a quantity corresponding to 3.7% by weight of the total polymer. In the cases of latex F and latex G, no coagulum was formed.

In Comparative Examples 6 to 8, compounding and vulcanization of rubber were carried out in the same manner as in Examples 9 to 11, except that latices E, F and G were not brominated, after which the tensile properties were measured. The results obtained were as shown in Table 3.

COMPARATIVE EXAMPLE 9

An NR (natural rubber) latex was brominated in the same manner as in Example 1, and the rubber was then compounded and vulcanized in the same manner as in Example 1 with the same recipe as shown in Table 2, except that the vulcanization accelerator was used in an amount of 0.5 part by weight and the vulcanization time was 30 minutes. The results obtained were as shown in Table 3.

COMPARATIVE EXAMPLE 10

An NR (natural rubber) latex was coagulated with methanol to separate the rubber. The rubber was dissolved in chloroform to form a solution having a concentration of 4% by weight. While stirring this chloroform solution, the bromine solution in chloroform was dropped thereinto at room temperature to brominate the rubber. Thereafter, the rubber was compounded and vulcanized with the same recipe as shown in Table 2 in the same manner as in Example 1, except that the vulcanization accelerator was used in an amount of 0.5 part by weight and the vulcanization time was 30 minutes and the tensile properties were measured. The results obtained were as shown in Table 3.

COMPARATIVE EXAMPLE 11

The procedure of Comparative Example 10 was repeated, except that a latex made from cis-1,4-polyisoprene was used as the starting material in place of the NR latex in Comparative Example 10. The results obtained were as shown in Table 3.

COMPARATIVE EXAMPLE 12

The procedure of Example 1 was repeated, except that the latex in Comparative Example 11 was used in place of the SBR latex A, and the recipe and vulcanization conditions were the same as in Comparative Example 11. The results obtained were as shown in Table 3.

COMPARATIVE EXAMPLE 13

The procedure of Comparative Example 10 was repeated, except that the SBR latex A shown in Table 1 was used in place of the NR latex, and the recipe and vulcanization conditions were the same as in Example 1. The results obtained were as shown in Table 3.

COMPARATIVE EXAMPLE 14 cis-1,4-Polybutadiene was dissolved in chloroform to form a solution having a concentration of 4% by weight and brominated with the bromine solution in chloroform in the same manner as in Comparative Example 10. Thereafter, compounding and vulcanization were carried out with the recipe shown in Table 2 by the same procedure as in Example 1, except that the vulcanization time was 30 minutes. The results obtained were as shown in Table 3.

TABLE 3

| | Kind of rubber | Conditions of bromination Bromine charged (g/100 g rubber) | Conditions of bromination State of system | Bromine content in brominated rubber (% by wt.) | Toluene-insoluble fraction (% by wt) | Mooney viscosity $MS_{1+4}$ 100°C Raw | Mooney viscosity $MS_{1+4}$ 100°C Compound | Green strength (kg/cm²) temperature Raw | Green strength (kg/cm²) temperature Compound | 50% Modulus (kg/cm²) 25°C | 50% Modulus (kg/cm²) 120°C | 100% Modulus (kg/cm²) 25°C | 100% Modulus (kg/cm²) 120°C | Tensile strength at break (kg/cm²) 25°C | Tensile strength at break (kg/cm²) 120°C | Elongation at break (%) 25°C | Elongation at break (%) 120°C | Processability of rubber at the time of compounding |
|---|---|---|---|---|---|---|---|---|---|---|---|---|---|---|---|---|---|---|
| Comparative Example 1 | SBR-A | 38.3 | — | 0 | 0 | 31 | 34 | — | 3.5 | 15 | 16 | 28 | 24 | 213 | 60 | 399 | 218 | Good |
| Example 1 | " | 9.4 | Latex | 5.0 | 12 | 42 | 39 | — | — | 28 | 18 | 60 | 43 | 213 | 74 | 272 | 156 | Good |
| Example 2 | " | 13.9 | " | 7.7 | 25 | 50 | 46 | — | 13.3 | 60 | 29 | 114 | 57 | 218 | 72 | 207 | 122 | Good |
| Example 3 | " | 16.0 | " | 9.6 | 13 | 56 | 51 | 3.2 | — | 93 | 35 | 154 | 73 | 202 | 73 | 148 | 102 | Good |
| Example 4 | " | 23.6 | " | 12.1 | 52 | 67 | 58 | — | 18.7 | 140 | 50 | — | — | 203 | 76 | 80 | 73 | Good |
| Example 5 | " | 8.1 | Latex(pH 5.74) | 4.2 | 20 | 82* | 73* | — | 8.4 | 32 | 22 | 65 | 39 | 202 | 80 | 284 | 169 | Good |
| Example 5' | " | 8.1 | Latex(pH 9.72) | 3.7 | 17 | 74* | 70* | — | 6.1 | 29 | 19 | 52 | 36 | 200 | 71 | 279 | 165 | Good |
| Comparative Example 2 | " | — | " | 18.8 | 85 | 92 | — | — | — | — | — | — | — | 225 | — | 20 | — | Poor in attachment to roll |
| Comparative Example 3 | SBR-B | — | — | 0 | 0 | 58 | — | 2.8 | 5.1 | 17 | 16 | 32 | 29 | 253 | 83 | 360 | 220 | Good |
| Example 6 | " | 10.9 | Latex | 6.3 | 5 | 79 | — | 4.6 | 13.7 | 49 | 28 | 104 | 61 | 235 | 78 | 205 | 117 | Good |
| Comparative Example 4 | SBR-C | — | — | 0 | 0 | 48* | 69* | — | 5.7 | 21 | 16 | 42 | 29 | 178 | 75 | 274 | 218 | Good |
| Example 7 | " | 9.7 | Latex | 4.9 | 10 | 67* | 68* | — | 10.4 | 43 | 18 | 81 | 36 | 214 | 80 | 231 | 191 | Good |
| Comparative Example 5 | SIR-D | — | — | 0 | 0 | 48* | 51* | — | — | 18 | — | 37 | — | 147 | — | 276 | — | Good |
| Example 8 | " | 11.1 | Latex | 4.8 | 5 | 35* | 48* | — | — | 35 | — | 57 | — | 143 | — | 260 | — | Good |
| Comparative Example 6 | SBR-E | — | — | 0 | 0.5 | 90* | 107* | — | 7.9 | 19 | 16 | 42 | 34 | 256 | 80 | 335 | 188 | Good |
| Example 9 | " | 16.9 | " | 8.8 | 65 | — | 85* | — | 27.1 | 116 | 56 | 179 | — | 213 | 103 | 137 | 98 | Good |
| Comparative Example 7 | SBR-F | — | — | 0 | 0 | 30* | 47* | — | 4.7 | 17 | 14 | 34 | 28 | 211 | 84 | 367 | 246 | Good |
| Example 10 | " | 16.9 | " | 12.5 | 37 | 60* | 87* | — | 25.1 | 25 | 18 | 51 | 37 | 221 | 87 | 304 | 195 | Good |
| Comparative Example 8 | SBR-G | — | — | 0 | 0 | 54* | 67* | — | 4.5 | 22 | — | 26 | — | 58 | — | 497 | — | Good |
| Example 11 | " | 16.9 | " | 8.5 | 13 | 69* | 73* | — | 7.6 | 20 | — | 26 | — | 81 | — | 470 | — | Good |
| Comparative Example 9 | NR | 10.0 | " | 8.2 | 4 | 55 | 28 | — | — | 9 | — | 16 | — | 64 | — | 315 | — | Poor in attachment to roll |
| Example 10 | NR | 8.7 | " | 7.6 | 0 | 38 | 24 | — | — | — | — | — | — | — | — | — | — | Poor in attachment to roll |
| Example 11 | IR | 3.1 | " | 3.9 | 0 | — | — | — | — | — | — | — | — | — | — | — | — | Good |
| Example 12 | IR | 11.1 | Latex | 8.0 | 1 | 36 | 33 | — | — | 19 | — | 28 | — | 124 | — | 450 | — | Good |
| Example 13 | SBR-A | 8.7 | Solution | 7.4 | 0 | 42 | 40 | — | — | 22 | 15 | 45 | 31 | 229 | 78 | 323 | 205 | Good |
| Example 14 | BR | 6.7 | " | 6.3 | 0 | — | — | — | — | 13 | 11 | 20 | 19 | 168 | 74 | 503 | 427 | Poor |

Note:
*$ML_{1+4}$ 100°C

EXAMPLE 12

A solution of 5.16 g of potassium hydroxide in 50 ml of water was added to 300 g of the SBR latex A shown in Table 1 (solid content 21.8% by weight). A 200 ml saturated aqueous bromine solution containing 6.2 g of bromine was dropped into the above-mentioned latex with stirring at room temperature over a period of 30 minutes to brominate the rubber. The latex had a pH value of 13.8 before addition of the bromine solution, while it had a pH value of 12.8 after addition of the bromine solution. After the reaction, there was observed no coagulum in the latex. The brominated latex thus obtained was poured into a large excess of methanol containing a small amount of 2,6-di-t-butyl-p-cresol to coagulate the brominated rubber, and then the latter was recovered. The brominated rubber thus obtained had a bromine content of 1.8% by weight, as measured according to JIS K-5580. It contained 5% by weight of toluene-insoluble fraction. The following ingredients were added to 100 parts by weight of the rubber thus obtained, and the mixture was compounded on open rolls:

| | |
|---|---|
| ISAF carbon black | 50 parts by weight |
| High aromatic process oil (JSR AROMA) | 10 parts by weight |
| Zinc oxide | 5 parts by weight |
| Stearic acid | 3 parts by weight |
| Vulcanization accelerator (N-oxydiethylene-2-benzothiazole sulfenamide) | 1.5 parts by weight |
| Sulfur | 2.5 parts by weight |

The resulting compound had a good processability. The results obtained and the reaction conditions are summarized in Table 4.

COMPARATIVE EXAMPLE 15

An experiment was carried out under the same conditions as in Example 12, except that the potassium hydroxide was used in an amount of 0.87 g. The pH value was 13.2 before bromination and 8.1 after bromination. As shown in Table 4, the formation of coagulum was remarkable.

EXAMPLES 13 TO 15

A brominated SBR was prepared by repeating the procedure of Example 12, except that the amount of the saturated aqueous bromine solution as a brominating agent was varied. The brominated SBR thus obtained was compounded with the same ingredients in the same proportion and by the same procedure as in Example 12, and the compound was rolled. The compound thus obtained was vulcanized in the same manner as in Example 12, and the tensile properties of the vulcanizate were measured. The results obtained and the reaction conditions are summarized in Table 4.

COMPARATIVE EXAMPLE 16

A brominated SBR was prepared by brominating the SBR latex A shown in Table 1 in the same manner as in Example 12, except that no alkali was added. The pH before the bromination was 9.7 and that after the bromination was 3.0. As shown in Table 4, a coagulum was produced in a larger amount. The brominated SBR was compounded with the same ingredients in the same proportion as in Example 12, and rolled. The compound was vulcanized by the same procesure as in Example 12, and the tensile properties of the vulcanizate were measured. The results are summarized in Table 4.

EXAMPLE 16 TO 19

A nonionic surfactant as shown in Table 4 was dissolved in 300 g of the SBR latex A shown in Table 1 (solid content: 21.8%) in a proportion as shown in Table 4. The pH of this latex was 9.7 in every case. The latex was brominated in the same manner as in Example 12, except that no alkali was added, and the resulting brominated rubber was compounded and vulcanized in the sammanner as in Example 12. Tensile properties of the vulcanizate were measured to obtain the results as shown in Table 4.

TABLE 4

| Example No. | Additive Kind | Additive Amount added (g/100 g rubber) | Bromine charged (g/100 g rubber) | Weight percentages of coagulum formed (%) | pH after reaction | Bromine Content in brominated rubber (% by wt.) | Toluene-insoluble fraction (% by wt.) | Compound Mooney viscosity (ML₁₊₄ 100°C.) | Green Strength (carbon-filled) (kg/cm²) | Properties of vulcanizate M₅₀(kg/cm²) 25°C. 120°C. | M₁₀₀(kg/cm²) 25°C. 120°C. | T_B (kg/cm²) 25°C. 120°C. | E_B (%) 25°C. 120°C. | Processability of rubber at the time of compounding |
|---|---|---|---|---|---|---|---|---|---|---|---|---|---|---|
| 12 | KOH | 7.89 | 8.1 | 0 | 12.8 | 1.8 | 5 | 71 | 9.5 | 21–18 (0.82) | 44–36 | 223–99 (0.44) | 319–212 | Good |
| 13 | KOH | 13.16 | 16.2 | 0 | 13.2 | 5.1 | 65 | 88 | 18.1 | 36–27 (0.75) | 83–61 | 245–94 (0.38) | 224–146 | Good |
| 14 | KOH | 7.89 | 16.2 | 0 | 12.5 | 6.3 | 42 | 105 | 20.0 | 54–32 (0.59) | 110–72 | 243–100 (0.41) | 201–128 | Good |
| 15 | KOH | 7.89 | 40.5 | 0 | 11.7 | 9.3 | 77 | 124 | 27.8 | 105–57 (0.54) | 193– | 233–101 (0.43) | 119–82 | Good |
| 16 | Polyoxyethylene nonylphenyl ether (HLB 14.4) | 3.5 | 10.8 | 7.2 | 2.2 | 4.3 | 26 | 77 | 18.5 | 36–23 (0.64) | 65–40 | 210–82 | 240–160 | Good |
| 17 | Polyethylene glycol monooleyl ether (HLB 17.7) | 3.5 | 10.8 | 10.4 | 2.1 | 4.9 | 31 | 74 | 10.1 | 31–20 (0.65) | 62–37 | 208–90 | 310–208 | Good |
| 18 | Polyoxyethylene sorbitan monolaurate (HLB 16.7) | 4.5 | 10.8 | 13.5 | 2.0 | 5.8 | 38 | 72 | 10.2 | 32–20 (0.63) | 65–42 | 209–84 | 273–171 | Good |
| 19 | Polyoxyethylene lauryl ether (HLB 16.3) | 4.0 | 10.8 | 14.5 | 2.2 | 4.5 | 40 | 78 | 10.8 | 34–21 (0.62) | 68–45 | 200–78 | 232–153 | Good |
| Comparative Example 15 | KOH | 1.33 | 8.1 | 47.5 | 8.1 | 1.1 | 17 | 65 | 3.8 | 25–19 (0.76) | 54–39 | 188–80 (0.43) | 266–176 | Good |
| Comparative Example 16 | None | — | 8.1 | 74.0 | 3.0 | 1.1 | 37 | 72 | 3.7 | 18–16 (0.89) | 37–22 | 210–70 (0.33) | 350–110 | Good |

Note:
In M₅₀ and T_B, the figures in parentheses refer to temperature dependency.
T_B means tensile strength at break.
E_B means elongation at break.

As seen from Table 4, the rubber compounds of this invention all have a good processability and a higher green strength than those in the Comparative Examples. Furthermore, the vulcanizates of the rubber compounds have a high modulus and exhibit a high tensile strength at ambient and elevated temperatures.

EXAMPLES 20 TO 23

To 500 g of the SBR latex A shwon in Table 1 was added a solution of 14.3 g of potassium hydroxide in 50 ml of water to adjust the pH of the latex to 13.5, and 1280 ml of the saturated aqueous bromine solution (bromine content: 39.3 g) was then dropped into the latex over 2 hours, after which the reaction was continued for a further 30 minutes. After the completion of the reaction, the brominated latex was poured into a large amount of methanol containing a small amount of 2,6-di-t-butyl-p-cresol to coagulate the latex and the brominated copolymer was then recovered.

The bromine content of the brominated copolymer thus obtained was measured by the method of JIS K-5580 to find that it was 12.4% by weight.

With 50 parts by weight of the brominated copolymer were compounded 50 parts by weight of natural rubber (NR), isoprene rubber (IR), butadiene rubber (BR) or styrene-butadiene rubber (SBR) and the ingredients shown in Table 4 in the amounts shown in Table 5, and the resulting compound was subjected to vulcanization under the conditions shown in Table 5. Tensile properties of the resulting vulcanizate were measured to obtain the results shown in Table 6.

COMPARATIVE EXAMPLES 17 TO 19

With 50 parts by weight of the SBR latex A shown in Table 1 were compounded 50 parts by weight of the same NR, IR or BR as in Examples 20 to 23 and the ingredients shown in Table 5 in the amounts shown in Table 5, and the resulting compound was vulcanized under the conditions shown in Table 5. The properties of the vulcanizate were as shown in Table 6.

From the results in Table 6, it can be seen that the compound of the unbrominated SBR with NR, IR or BR is inferior in green strength, modulus of elasticity and tensile strength to the compound of the brominated SBR with NR, IR or BR, respectively.

COMPARATIVE EXAMPLES 20 TO 23

The same NR, IR or BR as in Examples 20 to 22 was alone compounded with the ingredients shown in Table 5 and the resulting compound was vulcanized under the conditions shown in Table 5. The properties of the resulting vulcanizate were as shown in Table 6.

From the results shown in Table 6, it can be seen that the compound free from the brominated copolymer was inferior in tensile properties to the compound containing the brominated copolymer.

TABLE 5

| Ingredient | Examples 20 and 21 and Comp. Ex. 17 and 18 | Examples 22 and 23 and Comp. Ex. 19 and 20 | Comparative Example 21 | Comparative Examples 22 and 23 |
|---|---|---|---|---|
| Rubber mixture (parts by weight) | 100 | 100 | 100 | 100 |
| ISAF Carbon black (parts by weight) | 50 | 50 | 50 | 50 |
| Process oil (JSR AROMA) (parts by weight) | 10 | 10 | 10 | 10 |
| Zinc oxide (parts by weight) | 5 | 5 | 5 | 5 |
| Stearic acid (parts by weight) | 3 | 3 | 3 | 3 |
| Vulcanization accelerator (parts by weight) | | | | |
| N-oxydiethylene-2-benzothiazole s-lfenamide | 0 | 1.5 | 1.5 | 0 |
| Dibenzothiazolyl sulfide | 1.1 | 0 | 0 | 0.7 |
| Tetramethylthiuram disulfide | 0.1 | 0 | 0 | 0 |
| Sulfur (parts by weight) | 2.5 | 2.5 | 2.5 | 2.5 |
| Vulcanization conditions | | | | |
| Temperature (° C.) | 145 | 145 | 145 | 145 |
| Time (min) | 50 | 60 | 30 | 30 |

TABLE 6

| Example No. | Rubber blended | Mooney viscosity of compound ($ML_{1+4}^{100°C}$) | Green strength ($T_{max}$) (kg/cm$^2$) | 50% Modulus (kg/cm$^2$) At 25° C. | 50% Modulus (kg/cm$^2$) At 120° C. | 100% Modulus (kg/cm$^2$) At 25° C. | 100% Modulus (kg/cm$^2$) At 120° C. | Tensile strength at break (kg/cm$^2$) At 25° C. | Tensile strength at break (kg/cm$^2$) At 120° C. | Elongation at break (%) At 25° C. | Elongation at break (%) At 120° C. |
|---|---|---|---|---|---|---|---|---|---|---|---|
| 20 | NR*1 | 67 | 23.5 | 35 | 19 | 66 | 38 | 176 | 71 | 254 | 173 |
| 21 | IR*1 | 83 | 17.4 | 55 | 33 | 95 | 63 | 169 | 79 | 206 | 129 |
| 22 | BR*1 | 107 | 17.1 | 44 | 30 | 86 | 62 | 178 | 88 | 211 | 140 |
| 23 | SBR*1 | 102 | 25.9 | 37 | 21 | 75 | 44 | 218 | 90 | 259 | 169 |
| Comparative Example 17 | NR*2 | 42 | 14.7 | 15 | 12 | 29 | 22 | 166 | 89 | 360 | 332 |
| Comparative Example 18 | IR*2 | 51 | 4.3 | 14 | 12 | 27 | 21 | 144 | 79 | 359 | 309 |
| Comparative Example 19 | BR*2 | 61 | 3.7 | 17 | 16 | 32 | 29 | 152 | 83 | 325 | 247 |
| Comparative Example 20 | SBR*2 | 65 | 3.5 | 15 | 15 | 28 | 24 | 213 | 60 | 399 | 218 |
| Comparative Example 21 | BR*3 | 67 | 1.7 | 17 | 15 | 29 | 21 | 155 | 73 | 390 | 256 |
| Comparative Example 22 | IR*3 | 47 | 3.5 | 12 | 11 | 22 | 18 | 169 | 99 | 435 | 609 |

TABLE 6-continued

| Example No. | Rubber blended | Mooney viscosity of compound $(ML_{1+4}^{100° C.})$ | Green strength $(T_{max})$ (kg/cm²) | 50% Modulus (kg/cm²) | | 100% Modulus (kg/cm²) | | Tensile strength at break (kg/cm²) | | Elongation at break (%) | |
|---|---|---|---|---|---|---|---|---|---|---|---|
| | | | | At 25° C. | At 120° C. | At 25° C. | At 120° C. | At 25° C. | At 120° C. | At 25° C. | At 120° C. |
| Comparative Example 23 | NR*³ | 38 | 18.9 | 11 | 9 | 20 | 14 | 145 | 83 | 349 | 647 |

Note:
*¹The rubber was used together with the brominated SBR.
*²The rubber was used together with the unbrominated SBR.
*³The rubber was used alone.

EXAMPLES 24 TO 26 (TEST ON THERMAL STABILITY OF BROMINATED RUBBER)

The brominated rubber obtained in Example 14 was used in Example 24.

In Example 25, there was used a brominated rubber (bromine content: 6.4% by weight) obtained by repeating the same procedure as in Example 14, except that polyoxymethylene nonylphenyl ether (HLB 14.4) which is a nonionic surfactant was added in an amount of 2.5% by weight based on the weight of the rubber before the bromination and 16.2 parts by weight of bromine was reacted with 100 parts by weight of the rubber.

In Example 26, there was used a brominated rubber (bromine content: 6.9% by weight) obtained by repeating the same procedure as in Example 25, except that no potassium hydroxide was added before the bromination and bromine was used in a proportion of 13.6 parts by weight per 100 parts by weight of the rubber.

About 20 mg of each of the brominated rubbers was heated while elevating the temperature at a rate of 15° C./min by means of a thermo analyzer, and subjected to thermo gravity analysis to obtain the results shown in Table 7.

COMPARATIVE EXAMPLE 24

A brominated rubber (bromine content: 6.8% by weight) was prepared by effecting the bromination in solution in the same manner as in Comparative Example 13, except that bromine was used in a proportion of 7.5 g per 100 g of the rubber, and subjected to thermo gravity analysis as in Examples 24 to 26 to obtain the results shown in Table 7.

COMPARATIVE EXAMPLE 25

For comparison, a commercially available chloroprene rubber which was practically used as a halogen-containing rubber was subjected to thermo gravity analysis in the same manner as in Examples 24 to 26 to obtain the results shown in Table 7.

TABLE 7

| Temperature (°C.) | Room temp. | Percentage of residual weight | | | | | | |
|---|---|---|---|---|---|---|---|---|
| | | 100 | 200 | 250 | 300 | 350 | 400 | 425 |
| Example 24 | 100 | 100 | 98 | 96 | 93 | 90 | 80 | 50 |
| Example 25 | 100 | 100 | 96 | 94 | 92 | 88 | 80 | 50 |
| Example 26 | 100 | 100 | 94 | 91 | 88 | 82 | 73 | 50 |
| Comparative Example 24 | 100 | 100 | 94 | 90 | 86 | 78 | 65 | 50 |
| Comparative Example 25 | 100 | 100 | 97 | 94 | 86 | 64 | 45 | 40 |

The brominated rubbers used in Examples 24 to 26 which had been obtained by bromination in latex are smaller in thermal decomposition rate in a range of 300° to 400° C. than the brominated SBR used in Comparative Example 24 and the commercially available chloroprene rubber used in Comparative Example 25, and therefore, it can be seen tat the former brominated rubbers are superior in thermal stability to the latter.

What is claimed is:

1. A brominated rubber containing 3-80% by weight of toluene-insoluble fraction which is obtained by brominating an elastomeric copolymer composed of 50% by weight or more of a $C_4$ or $C_5$ conjugated diene and 50% by weight or less of an aromatic vinyl compound in latex in the presence of a surfactant while keeping the uniformity of the latex until the amount of bromine combined with the rubber reaches 0.5-15% by weight.

2. A brominated rubber according to claim 1, wherein said rubber latex contains an anionic surfactant as an emulsifier in a proportion of 0.5 to 15% by weight based on the weight of the rubber component, and the pH of the latex is maintained at 9 or more from the beginning of the bromination to its end, whereby the uniformity of the latex is maintained.

3. A brominated rubber according to claim 2, wherein the pH of the latex is maintained at 10 or more.

4. A brominated rubber according to claim 2, wherein the rubber latex additionally contains a nonionic surfactant in a proportion of 2 to 15% by weight based on the weight of the rubber component.

5. A brominated rubber according to claim 4, wherein the bromination is carried out at a pH value lower than 7.

6. A brominated rubber according to claim 2, 3, 4 or 5, wherein said anionic surfactant is an alkali metal salt of higher fatty acid, rosin acid, an alkali metal salt of disproportionated rosin acid, a tall oil soap, an alkali metal salt of sulfonic acid or a salt of a mono-sulfuric ester of a higher alcohol.

7. A brominated rubber according to claim 2, 3, 4 or 5, wherein said anionic surfactant is potassium oleate, sodium oleate, sodium stearate, rosin acid, sodium or potassium salt of disproportionated rosin acid, tall oil soap, potassium dodecylbenzenesulfonate, potassium ligninsulfonate or sodium salt of monosulfuric ester of oleyl alcohol.

8. A brominated rubber according to claim 2, 3, 4 or 5, wherein said anionic surfactant is potassium salt of disproportionated rosin acid.

9. A brominated rubber according to claim 4 or 5, wherein said nonionic surfactant is polyoxyethylene cetyl ether, polyoxyethylene lauryl ether, mono-(higher fatty acid) ester of pentaerythritol, or polyoxyethylene nonylphenyl ether.

10. A brominated rubber according to claim 1, wherein the rubber latex contains, as an emulsifier, 2 to 15% by weight of an nonionic surfactant based on the weight of the rubber component whereby the uniformity of latex is maintained.

11. A brominated rubber according to claim 10, wherein said nonionic surfactant is polyoxyethylene nonylphenyl ether, or polyoxyethylene oleyl ether.

12. A brominated rubber according to claim 1, wherein the rubber latex contains, as an emulsifier, 0.5 to 15% by weight of a cationic surfactant based on the weight of the rubber component whereby the uniformity of latex is maintained.

13. A brominated rubber according to claim 12, wherein said cationic surfactant is dodecyltrimethylammonium chloride, triethanolamine monostearate or pyridinium salt of N-methylol oleamide.

14. A brominated rubber according to claim 1, wherein said elastomeric copolymer is a copolymer of styrene and butadiene, isoprene or 1,3-pentadiene.

15. A brominated rubber according to claim 14, wherein said elastomeric copolymer is a copolymer composed of 60% by weight or more of butadiene and 40% by weight or less of styrene.

16. A brominated rubber according to claim 1, wherein said brominated rubber contains 1–10% by weight of bromine.

17. A rubber compound comprising the brominated rubber of claim 1, sulfur and additives conventionally incorporated into rubbers.

18. A rubber composition comprising the brominated rubber of claim 1 and natural rubber, polyisoprene rubber, polybutadiene rubber, styrene-butadiene rubber, acrylonitrile-butadiene rubber, chloroprene rubber, isobutyleneisoprene rubber, or ethylene-propylenediene rubber.

19. A rubber composition comprising the brominated rubber of claim 1 and natural rubber, polyisoprene rubber, polybutadiene rubber, or styrene-butadiene rubber.

* * * * *